US012202063B2

(12) United States Patent
Wille et al.

(10) Patent No.: US 12,202,063 B2
(45) Date of Patent: Jan. 21, 2025

(54) SYSTEM AND METHOD FOR EFFICIENT MATERIAL MEASUREMENT AND CONVERSION

(71) Applicant: SOLUTION MAVERICKS, LLC, Waukesha, WI (US)

(72) Inventors: Joel Wille, Waukesha, WI (US); Mark Wille, Oconomowoc, WI (US); Bjorn Barja, Athens, GA (US)

( * ) Notice: Subject to any disclaimer, the term of this patent is extended or adjusted under 35 U.S.C. 154(b) by 715 days.

(21) Appl. No.: 17/398,943

(22) Filed: Aug. 10, 2021

(65) Prior Publication Data
US 2022/0040772 A1 Feb. 10, 2022

Related U.S. Application Data

(60) Provisional application No. 63/063,678, filed on Aug. 10, 2020.

(51) Int. Cl.
| | |
|---|---|
| *G01B 3/1071* | (2020.01) |
| *B23D 59/00* | (2006.01) |
| *B27B 5/29* | (2006.01) |
| *B27B 27/06* | (2006.01) |
| *G01B 3/1061* | (2020.01) |

(52) U.S. Cl.
CPC .............. *B23D 59/002* (2013.01); *B27B 5/29* (2013.01); *B27B 27/06* (2013.01); *G01B 3/1061* (2013.01); *G01B 3/1071* (2013.01)

(58) Field of Classification Search
CPC ......... B23D 59/002; B27B 5/29; B27B 27/06; B27B 27/10; G01B 3/1061; G01B 3/1071
See application file for complete search history.

(56) References Cited

U.S. PATENT DOCUMENTS

| | | | | |
|---|---|---|---|---|
| 1,942,873 | A | * | 1/1934 | Narrow .................... B41B 5/08 269/319 |
| 2,518,728 | A | * | 8/1950 | Snow ..................... B27B 27/04 83/468.2 |
| 2,619,134 | A | * | 11/1952 | West ....................... B27B 27/04 83/521 |
| 2,747,625 | A | * | 5/1956 | Small ..................... B27B 27/04 269/305 |
| 3,807,269 | A | * | 4/1974 | Mertes .................. B23Q 3/007 83/522.19 |
| 3,811,196 | A | | 5/1974 | Smith |

(Continued)

FOREIGN PATENT DOCUMENTS

EP 1671763 6/2006

*Primary Examiner* — Jonathan G Riley
(74) *Attorney, Agent, or Firm* — Smith Tempel Blaha LLC; Matthew T. Hoots

(57) ABSTRACT

Exemplary embodiments of a "Smart Cut" system and method for efficiently and accurately converting material length using a powered saw, such as a miter saw, are disclosed. Certain embodiments are configured such that a user of a miter saw may position a board or other material beneath the miter saw blade, and cut the material to a desired length, without any need to mark a measurement on the material prior to cutting it. It is an advantage of certain embodiments that a typical retractable tape measurement device, a portable tool that is ubiquitous in the construction industry, may be leveraged to indicate proper positioning of the material prior to cutting.

16 Claims, 10 Drawing Sheets

(56) References Cited

U.S. PATENT DOCUMENTS

| | | | | |
|---|---|---|---|---|
| 4,322,066 | A * | 3/1982 | Disney | B27B 27/10 269/304 |
| 4,557,170 | A * | 12/1985 | Ingham | B27B 27/08 83/471.2 |
| 4,693,158 | A * | 9/1987 | Price | B23Q 16/001 144/287 |
| 4,785,550 | A * | 11/1988 | Wilkins | B23D 55/043 33/833 |
| 4,874,025 | A * | 10/1989 | Cleveland | B23D 47/025 144/287 |
| 4,987,813 | A * | 1/1991 | Viazanko | B23D 47/025 144/286.5 |
| 5,040,443 | A * | 8/1991 | Price | B27B 27/06 144/287 |
| 5,197,365 | A * | 3/1993 | Clifton | B23Q 17/22 83/522.19 |
| 5,269,356 | A * | 12/1993 | Bartz | B23D 47/025 144/345 |
| 5,327,653 | A * | 7/1994 | Pistorius | G01D 5/145 33/708 |
| 5,518,053 | A * | 5/1996 | Robison | B23Q 1/76 144/287 |
| 5,787,599 | A | 8/1998 | Clifton | |
| 5,845,410 | A * | 12/1998 | Boker | B27B 25/10 33/469 |
| 6,477,929 | B1 * | 11/2002 | Gibbs, Sr. | B23Q 1/74 83/13 |
| 6,684,519 | B1 | 2/2004 | McAllisterr | |
| 6,899,006 | B2 | 5/2005 | Jolkovski | |
| 7,165,338 | B2 | 1/2007 | Clifton | |
| 8,091,250 | B1 * | 1/2012 | Jinks | G01B 3/1056 33/758 |
| 9,505,071 | B2 | 5/2016 | Knight et al. | |
| 11,554,513 | B1 * | 1/2023 | Larsson | B27B 27/02 |
| 2004/0144222 | A1 | 7/2004 | Wayne | |
| 2005/0056132 | A1 * | 3/2005 | Smith | B27G 5/023 83/438 |
| 2006/0139618 | A1 * | 6/2006 | Pando | G01C 3/08 83/522.19 |
| 2008/0282862 | A1 * | 11/2008 | Wise | B27B 27/10 83/468.2 |
| 2009/0019717 | A1 | 1/2009 | Nortmann et al. | |
| 2010/0064869 | A1 | 3/2010 | Poole | |
| 2011/0048202 | A1 | 3/2011 | Peterson et al. | |
| 2016/0136742 | A1 * | 5/2016 | Knight | B23Q 17/20 33/640 |
| 2018/0311751 | A1 | 11/2018 | Mayer et al. | |
| 2019/0039157 | A1 * | 2/2019 | Hanrahan | B23D 51/02 |
| 2019/0339051 | A1 * | 11/2019 | Echols | G01B 5/02 |
| 2023/0140756 | A1 * | 5/2023 | Donnell | B27B 27/08 33/628 |
| 2023/0294321 | A1 * | 9/2023 | Cluff | B27B 27/02 83/522.16 |

* cited by examiner

SYSTEM AND METHOD FOR EFFICIENT MATERIAL MEASUREMENT AND CONVERSION

CROSS-REFERENCE TO RELATED APPLICATIONS

The present application is a non-provisional application claiming the benefit of the filing date of the U.S. Provisional Application Ser. No. 63/063,678 filed on Aug. 10, 2020, the application for which is hereby incorporated by reference in its entirety along with any and all of its figures, exhibits and appendices.

BACKGROUND

The present invention relates to systems and methods for measuring and marking material for length conversion and, more particularly, to a novel system and method for efficiently measuring and converting material length (without marking) using a miter saw or radial arm saw or table saw or the like.

In the construction industry, for example, the process of converting or "cutting" material (such as boards, conduit, piping, siding, etc.) to required lengths can be a time consuming and inefficient process. Certainly, and as one of ordinary skill in the art would attest, a construction project can be built no quicker than the material used to build the project can be cut to length. On a typical construction jobsite, all kinds of material are constantly being cut to desired lengths, especially during certain construction phases such as framing, plumbing, or trimming. Consequently, the more efficiently and accurately material length can be converted the more efficiently and quickly a construction project can be completed.

And so, considering that "time is money" in the construction industry, there is a need in the art for a system and method that may improve the efficiency and accuracy associated with converting material lengths on a construction project. More specifically, there is a need in the art for a system and method that may improve the speed and accuracy of material length conversion using a saw.

SUMMARY

Exemplary embodiments of a "Smart Cut" system and method for efficiently and accurately converting material length using a powered saw, such as a miter saw, are disclosed. Certain embodiments are configured such that a user of a miter saw may position a board or other material beneath the miter saw blade, and cut the material to a desired length, without any need to mark a measurement on the material prior to cutting it. It is an advantage of certain embodiments that a typical retractable tape measurement device, a portable tool that is ubiquitous in the construction industry, may be leveraged to indicate proper positioning of the material prior to cutting.

An exemplary embodiment of a Smart Cut according to the solution is a mechanical accurate measuring device for miter saw operations in measuring and cutting boards, piping, conduit, siding or other materials in the residential and commercial construction field. A Smart Cut advantageously provides continuous accurate measurements of material lengths for miter saw operations with the use of a craftsman's own tape measure device. Once a known distance is set between the miter saw blade and a stop surface of a rabbit assembly (I.e., the Smart Cut is calibrated), board cutting measurements may be indicated on the tape blade of the tape measurement device. The measurement of the board is accomplished by the tape measure device's spring-loaded retraction force pulling against the rabbit assembly, where one end of the board is seated on the stop surface of the rabbit assembly, providing a reading on the tape measure blade that represents where the saw blade is in relation to the stop surface of the rabbit assembly (where end of the board furthest away from the saw blade is).

Advantageously, individual boards do not have to be measured, squared or marked prior to making accurate cuts. An exemplary Smart Cut embodiment "out of the box" may make measurements up to 90 inches, although it is envisioned that other embodiments may be configured for a maximum cut length that is longer than, or shorter than, 90 inches. In some embodiments, the table component of the solution may be modular such that successive lengths of the table may be attached in order to vary the length of the table and, in concert, the practical length of the material capable of length conversion.

Embodiments of the Smart Cut solution address the challenge of getting a board to easily horizontally plane out to the miter saw deck with the use of leveling means that adjust to various miter saws that have variable deck heights and deck lengths.

An exemplary embodiment of the Smart Cut solution for converting material length using a powered saw comprises a table defining a substantially horizontal plane and a fence mounted to the table and defining a vertical plane. The system further comprises a carriage assembly configured for removably receiving a tape measuring device. A spring-loaded tape measuring device comprising a retractable blade with measurement demarcations is removably mounted on the carriage assembly and a measurement indicator is positioned in association with the retractable blade to indicate a measurement. The exemplary embodiment further comprises a rabbit assembly in slidable communication with the fence. A hook end of the retractable blade is removably connected to the rabbit assembly such that position of the rabbit assembly along the fence is urged or countered by the spring-loaded tape measuring device. When the table is mounted to a powered saw with a saw blade, the measurement indicated by the measurement indicator corresponds to a length between a stop surface of the rabbit assembly and a proximate edge of the saw blade. Advantageously, because the Smart Cut solution does not require mounting on the fence or deck of a saw, embodiments are "universal" in design. That is, single embodiments of the solution may be configured for use with diverse saw designs, blade sizes, etc.

The measurement indicator may comprise a needle in some embodiments. In other embodiments, the measurement indicator may comprise a light beam. The rabbit assembly in the exemplary embodiment comprises one or more sheaves configured to promote transition of the rabbit assembly position along the fence. However, it is envisioned that all embodiments of the solution may not include sheaves per se as some may incorporate bearings or other known means for reducing friction and promoting transition of the rabbit assembly position along the fence.

The stop surface of the rabbit assembly of the exemplary embodiment is defined by a pair of jig components. The first jig component of the pair of jig components is operable to rotate away from a second jig component when the second jig component is in use. The first jig component defines a stop surface configured for receipt of mitered board and the second jig component defines a stop surface configured for a square cut board. The rabbit assembly further comprises a tape measure calibration bracket operable to be adjusted relative to the carriage assembly. And, a rabbit stop configured to prevent the rabbit assembly from traveling beyond a given point of the fence is included in the exemplary embodiment. Adjustable legs and/or other means of adjustment are included in the exemplary embodiment for aligning the table with a deck of the saw. Also, it is an advantage of embodiments of the solution that, once calibrated, accurate measurements may be determined, and cuts made, on construction material whether the cuts are square on one end and mitered on the other, square on both ends, mitered on both ends, etc. Moreover, embodiments of the solution are operable for making inside and outside miter cuts, as would be appreciated by one of ordinary skill in the art.

BRIEF DESCRIPTION OF THE DRAWINGS

In the drawings, like reference numerals refer to like parts throughout the various views unless otherwise indicated. For reference numerals with letter character designations such as "125A" or "125B", the letter character designations may differentiate two like parts or similar elements present in the same figure. When used in this way, letter character designations for reference numerals may be omitted when it is intended that a reference numeral encompass all parts having the same reference numeral in all figures. Similarly, for reference numerals with letter character designations such as "100A" or "100B", the letter character designations may differentiate two complementary parts or elements present in the same figure that, together, comprise a whole. When used in this second way, letter character designations for reference numerals may be omitted when it is intended that a reference numeral encompass the whole.

DETAILED DESCRIPTION

Figure 1A:
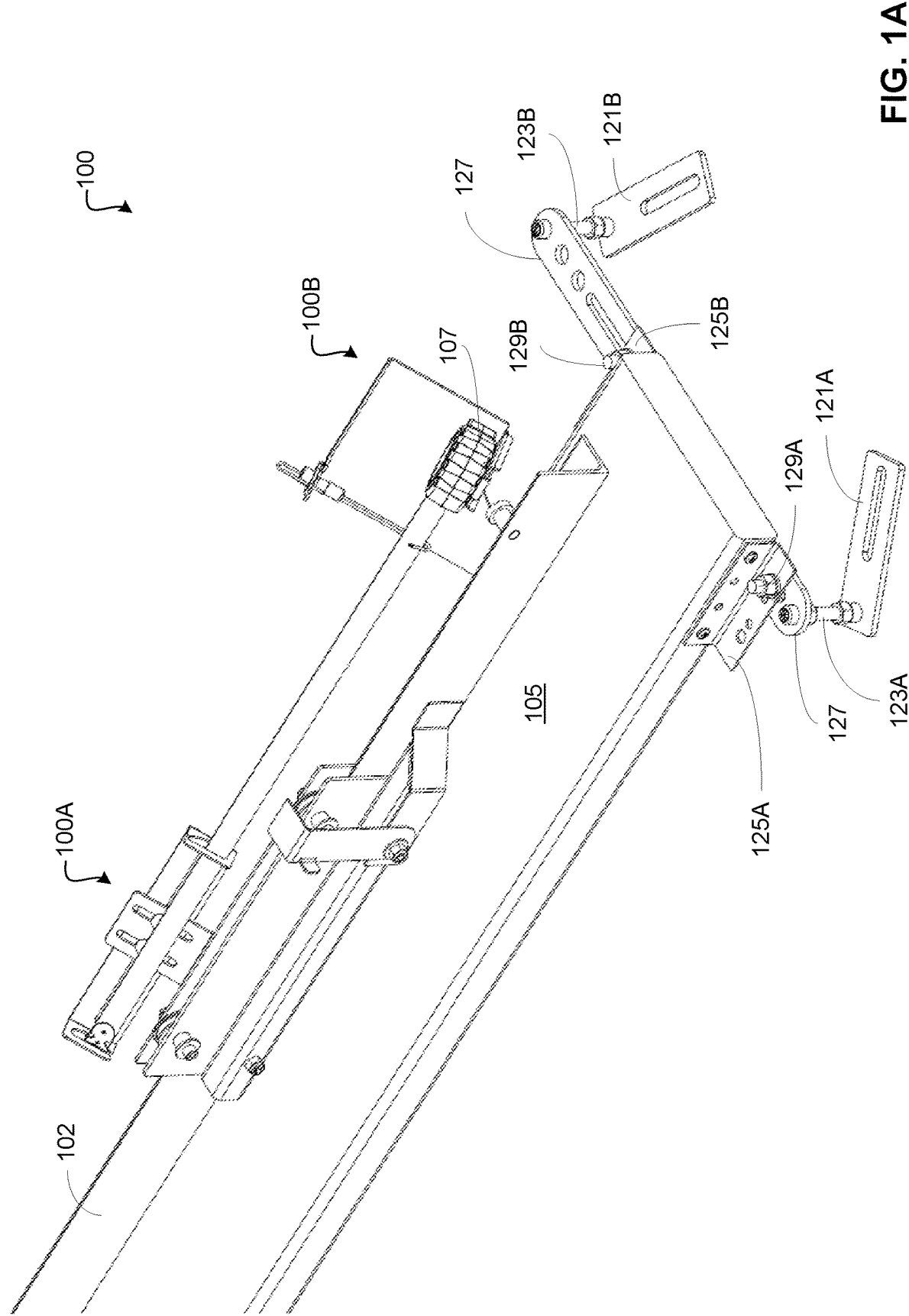
FIG. 1A illustrates a perspective view of an exemplary embodiment of a Smart Cut solution, shown apart from being mounted to a saw.

Various embodiments, aspects and features of the present invention encompass a system and method for improving the speed and accuracy of material length conversion using a miter saw or radial arm saw or chop saw or table saw or the like. Embodiments of the solution include various advantages over prior art solutions, as will become better understood from a review of the figures and description that follows. In this description, for ease of reference and readability the term "Smart Cut" is used as a noun to refer to the solution in general and is not meant to suggest that the scope of the solution is necessarily limited to the exemplary embodiment(s) of the solution herein shown and described.

In this description, the terms "tape measure" and "measuring tape" and the like are used interchangeably to refer to a typical retracting tape measure that would be known and understood in the art. As one of ordinary skill in the art would recognize, a tape measure is a ubiquitous portable tool in construction typically carried by a user and used whenever anything requires linear measurement. It is an advantage of some embodiments of the solution that a typical tape measure may be leveraged for a measurement component of the solution; however, it will be understood that the scope of the solution is not limited to use of a tape measure. For example, it is envisioned that some embodiments of the Smart Cut solution may incorporate an integrated measuring device that may not be removed and used apart from the Smart Cut.

In this description, the terms "tape" and "blade" are used interchangeably to refer to the portion of a tape measure that includes demarcations denoting imperial and/or metric measurements, as would be understood by one of ordinary skill in the art. The tape or blade may be extended from a casing of the tape measure and retracted via a spring mechanism, as would be understood by one of ordinary skill in the art of tape measures. A hook element may be mounted to the end of the tape such that, when hooked onto an object, the length of the object may be determined based on a demarcation on the tape that aligns with the opposite end of the object. Unless impeded, the blade will retract back into the casing and take a rolled state in response to a spring force associated with the aforementioned spring mechanism.

In this description, the terms "chop saw" and "radial arm saw" and "miter saw" and "table saw" and "saw" are used interchangeably. As can be seen and understood from the figures that follow, it is envisioned that embodiments of the Smart Cut may be configured to mechanically interface with a miter saw that includes a dedicated table surface and fence and is mounted to a stand, although it is envisioned that other embodiments may not require that the miter saw be mounted on a stand.

In this description, the term "board" is used interchangeably with any other construction material that may be converted using a saw and, as such, is not meant to suggest that any one or more embodiments of the Smart Cut solution are limited in application to cutting boards. Indeed, a Smart Cut solution embodiment may be configured for accurate and efficient measurement of any material for which a given saw is suitable for converting such as, but not limited to, exterior siding, trim, piping, etc.

A typical prior art method for converting the length of a piece of material, such as a board, is tedious and generally inefficient. As one of ordinary skill in the art would attest, any level of efficiency that may be demonstrated when employing the typical prior art methodology for cutting a board is solely attributable to the practice and skill of the person charged with cutting the board. As such, and as will become more apparent from a review of the figures and description that follows, an advantage of the Smart Cut solution is that a user with relatively little experience may efficiently and quickly and accurately convert board lengths.

Typically, a saw user or "cut guy" (as they're colloquially referred to on construction job sites) uses a measuring tape to determine where a board should be cut in order to convert the board's length to the desired length. The tape measure is "hooked" to an end of the board then stretched along the length of the board. The user then marks the board such that the desired length is from the mark to the end of the board. Notably, for long boards the user may have to walk down the board, or otherwise leave his position in front of the saw, in order to hook the tape measure on the board and/or determine the right spot for the mark.

With the board marked, the user removes the tape measure and, in some instances, may leverage a "square" or other straight edge to draw a line across the board commensurate with the placement of the afore mentioned mark. The line created using the square will represent the point at which the board should be cut. With the line marked on the board, the user then must reposition the board such that the marked line is beneath, or otherwise aligned with, the blade of the saw. Typically, in order to align the mark line with the saw blade, the user may lower the saw blade (without powering it for cutting) and adjust the board's position minutely until the mark line aligns with the edge of the blade. Once aligned with the edge of the blade, the saw blade may be powered and used to cut through the board, as would be understood by one of ordinary skill in the art.

As one of ordinary skill in the art would readily understand and admit, the prior art process for converting the length of a board (or any other construction material), especially a relatively long board, is time consuming and inefficient even for the most skilled and experienced cut guy. Advantageously, embodiments of the Smart Cut solution reduce, or make more efficient, the steps involved and leading up to aligning a board with a saw blade edge for a cut.

Turning now to the figures, illustrated is an exemplary embodiment of the Smart Cut solution including a method for interfacing the Smart Cut with an exemplary miter saw. The illustrations in the figures include descriptions of the various components of the exemplary Smart Cut solution and their functions. One of ordinary skill in the art reviewing the illustrations of the figures would be enabled to manufacture an embodiment of the solution, mechanically interface the embodiment to a saw (such as, but not limited to, a miter saw), calibrate the embodiment such that the actual distance between a stop surface of the rabbit and the edge of the saw blade corresponds to a measurement displayed on the tape measure, and use the calibrated embodiment to quickly and efficiently convert the length of a board or other construction material.

Figure 1B:
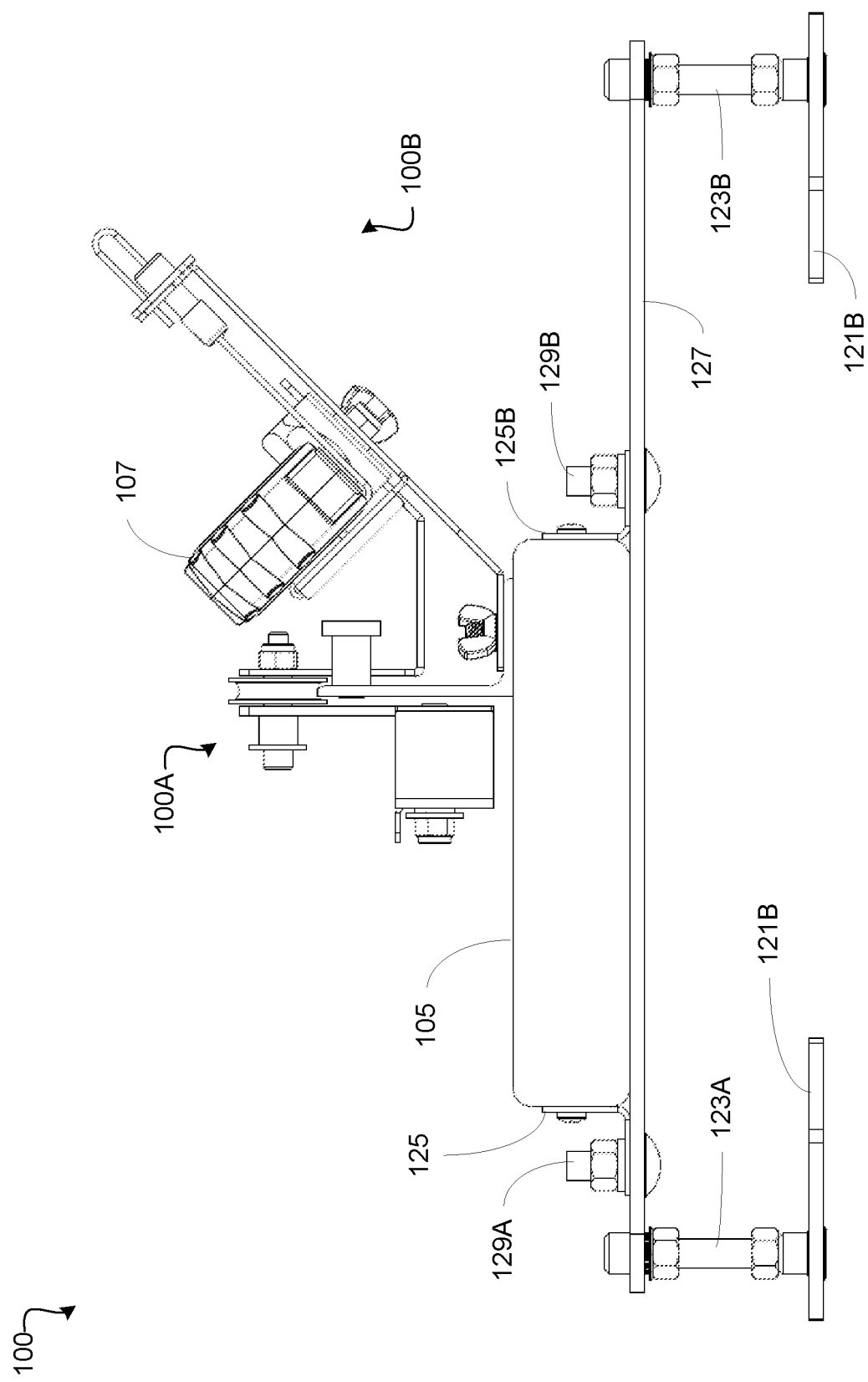
FIG. 1B is an end view of the exemplary embodiment illustrated in FIG. 1A.
Figure 2:
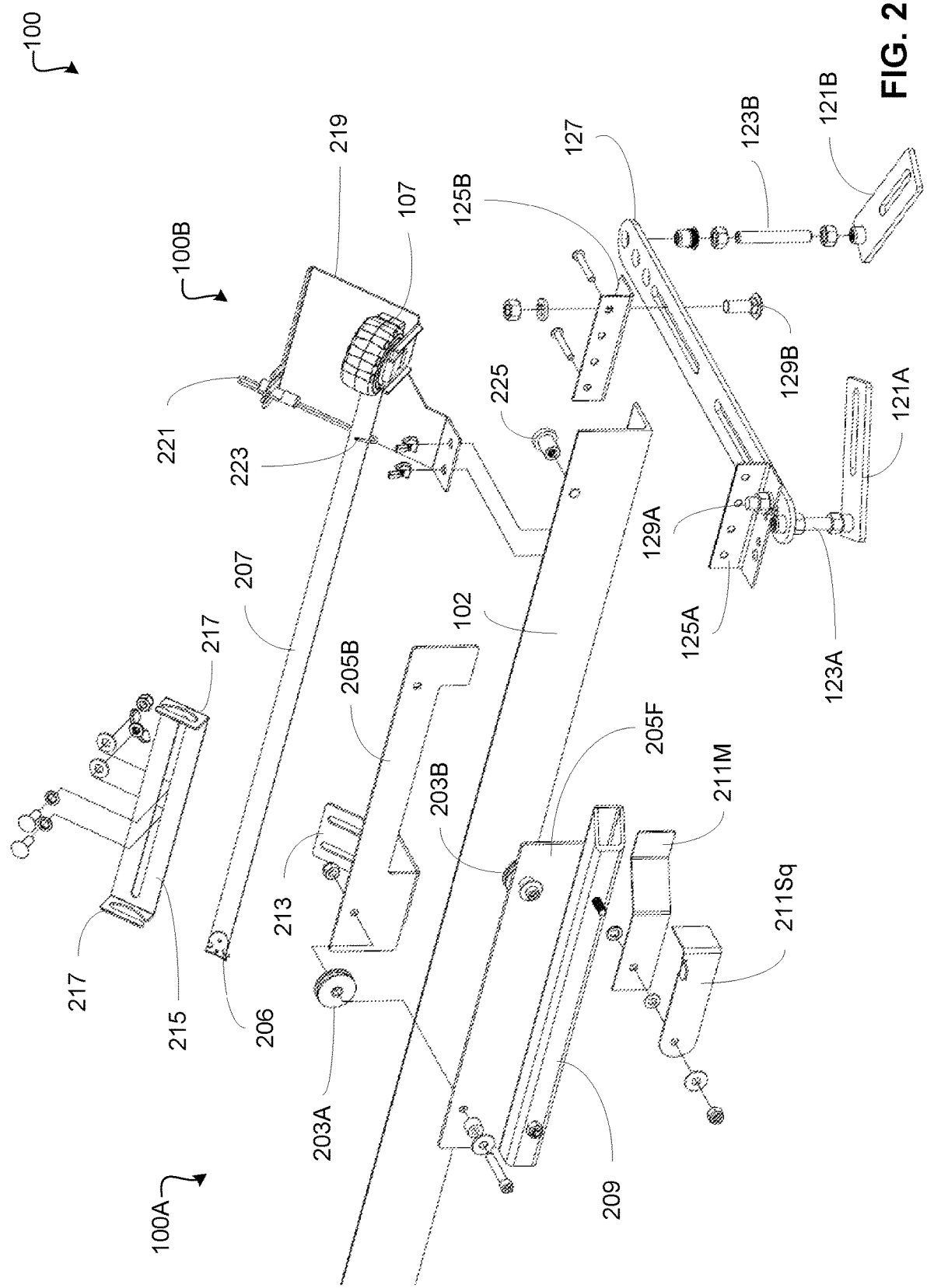
FIG. 2 is an exploded view of the exemplary embodiment of a Smart Cut solution illustrated in FIGS. 1A and 1B.

FIG. 1A illustrates a perspective view of an exemplary embodiment 100 of a Smart Cut solution, shown apart from being mounted to a saw. And, FIG. 1B is an end view of the exemplary embodiment 100 illustrated in FIG. 1A. The FIGS. 1A and 1B illustrations will be described simultaneously to provide the reader with a general understanding of a Smart Cut invention according to the solution. More detail regarding components and assembly of the exemplary embodiment shown in the figures will be offered in connection with the FIG. 2 illustration.

The exemplary Smart Cut embodiment 100 generally consists of a rabbit assembly 100A and a tape measure carriage assembly 100B. As shown in the FIG. 1 illustrations, the tape measure carriage assembly 100B may be configured to removably receive a tape measure 107. The body (or casing) of the tape measure 107 rests on the carriage assembly 100B while the blade is extended such that the hook on the end of the blade may be removably received by the rabbit assembly 100A, as can be understood from the FIG. 1 illustrations. Notably, it is an advantage of certain embodiments of the Smart Cut solution (such as the exemplary embodiment illustrated in the figures) that the tape measure 107 may not be permanently dedicated to use in the solution but, rather, may be easily removed from the embodiment for other uses apart from the Smart Cut. Even so, it is envisioned that certain other embodiments of a Smart Cut solution may incorporate a non-removable tape measure and, as such, the scope of the disclosure for a Smart Cut solution may not be limited in this way to the illustrated embodiments that envision a removable tape measure.

Returning to the FIG. 1 illustrations, the rabbit assembly 100A movably rides on fence 102. Fence 102 defines a plane that is substantially vertical relative to a plane defined by table 105. It is envisioned that table 105 may be of any length necessary and required for support of construction material in need of length conversion. At a near end of the table 105, the tape measure carriage assembly 100B is mounted to the fence 102. The tape measure carriage assembly 100B does not move relative to its mounted position on fence 102. Also at this near end of the table 105 is a hardware assembly operable to mechanically mate the table 105 to a saw (as will be shown in subsequent figures). The hardware assembly may include a table support plate 127. The table 105 may be mechanically fixed to the support plate 127 via a pair of mounting brackets 125A, 125B and fasteners 129A, 129B. The relative position of the table 105 on the support plate 127 may be adjusted, front to back, by loosening the fasteners 129 and "sliding" the table 105 and brackets 125 to a desired position before retightening fasteners 129. As can be seen in the illustration, support plate 127 includes a groove through which fasteners 129 are slidably mounted.

The support plate 127 may further include one or more holes for receiving height adjustable legs 123A, 123B. At the base of height adjustable legs 123 may be saw mounting brackets 121A, 121B. As will become more apparent from consideration and review of figures that follow, when the saw mounting brackets 121 are mated to an edge of a saw (such as a miter saw), adjustment of the height adjustable legs 123 in conjunction with positioning of the table 105 along the support plate 127 enables a user to align the table 105 with a table surface of the saw. In this way, construction material placed on table 105 may be easily slid from table 105 onto and over the saw table. Moreover, because the Smart Cut embodiment is mechanically mated to the saw via saw mounting brackets 121, calibration of the Smart Cut may be reliably maintained. Advantageously, because the Smart Cut solution is configured for interfacing with a saw, as opposed to being mounted physically on the saw such as on its deck or fence, embodiments of the solution may be universally operable across a wide range of saw designs, types and sizes. That is, the attachment and leveling means illustrated in the figures and described above in the exemplary embodiment of the solution enable a user to interface a Smart Cut embodiment with a wide variety of saw types and designs.

FIG. 2 is an exploded view of the exemplary embodiment 100 of a Smart Cut solution illustrated in FIGS. 1A and 1B. For ease of visual comprehension, the exploded view in the FIG. 2 illustration does not include the table 105. As previously described, the table support plate 127 may include grooves for slidably receiving fasteners 129 such that the table 105 (not shown in the FIG. 2 illustration) may be adjusted in position along the length of the support plate 127. The support plate 127 may also include a pair or more of holes positioned and configured to receive height adjustable legs 123. As can be better understood from the exploded figure in the FIG. 2 illustration, height adjustable legs 123 may be comprised of a threaded post, shouldered grommet sized for the holes, and nuts. Adjustment of the nuts may work to adjust the height of the plate 127 (and, by extension, the relative height of table 105) relative to a table surface associated with a saw.

The rabbit assembly 100A and tape measure carriage assembly 100B mechanically interface with fence 102. The carriage assembly 100B may include a plate 219 that is fixedly mounted to the backside of fence 102. The plate 219 also includes a measurement indicator 221 that, in the exemplary embodiment 100, comprises a needle 223 as the sight indicator referenced by a user. The needle 223 is in the form of a hook and positioned such that the tape blade 207 of a removably mounted tape measure device 107 may be extended through the trough or gap of the hook such that the needle 223 is operable to visually indicate a measurement demarcation on the tape blade 207. Other forms of a sight indicator are envisioned and, as such, all embodiments of a Smart Cut solution may not necessarily use a hook/needle configuration for a sight indication of measurement. Other shapes for sight indicator components will occur to those with skill in the art. It is envisioned, for example, that certain cross-sectional profiles for the sight indicator may improve measurement readings by a user who is in front of the saw and slightly "offset" from the sight indicator. It is further envisioned that in alternative embodiments of the solution the measurement indicator 221 may generate a light beam to indicate a measurement demarcation.

The body of the rabbit assembly 100A in the exemplary embodiment is formed from a pair of mated plates 205, front plate 205F and backside plate 205B. Sandwiched between body plates 205 are a pair of sheaves 203A, 203B. The treads of the sheaves 203 receive the upper edge of fence 102 such that the entire rabbit assembly 100A may be rolled along the length of the upper edge of the fence 102. In this way, the rabbit assembly 100A may be positioned anywhere along the fence 102. A rabbit stop 225, however, prevents the rabbit assembly 100A from being pulled beyond the front end of the fence 102. Although not shown in any of the illustrations, a complementary rabbit stop may be located at the opposite end of the fence 102 from stop 225. Advantageously, it is envisioned that a complementary rabbit stop at the distal end of the fence 102 may be adjustable in location such that its placement may be used as a quick and easy means for "stopping" the rabbit at a consistent point when making repeated board cuts at a desired length. Additionally, the sheaves 203 may be in the form of bearings or any other means understood in the art for promoting travel of the rabbit assembly 100A along the fence 102.

Returning to the rabbit assembly 100A, a block bar 209 may be integral to the front plate 205F. As will be seen in subsequent figures, the block bar 209 works to receive an end of a board. The block bar 209 may comprise jig components 211 for providing a stop surface that accommodates square cut ends and/or miter cut ends of a board. In the exemplary embodiment of the figures, jig component 211M is mounted to block bar 209 and is configured to accommodate a mitered board end. The jig component 211Sq is rotatably mounted in front of the arm 211M such that it may be rotated up and out of the way when the user is working with a mitered board and then rotated down in front of the arm 211M when the user is working with a square cut (i.e., a butt cut) board.

Backside plate 205B includes a slotted mounting plate 213 for adjustably receiving the tape measure calibration bracket 215. The tape measure calibration bracket 215 may be slotted such that bolts or other fasteners extended through the calibration bracket 215 and the mounting plate 213 may be leveraged to adjust the position of the bracket 215 relative to the plate 213. At either end of the tape measure calibration bracket 215 may be slots 217 operable to receive the tape blade 207. The hook 206 on the end of the tape blade 207 may be engaged with the distal most slot 217. In this way, as the rabbit assembly 100A is transitioned along the fence 102 away from the near end of table 105 (i.e, away from the saw) the tape blade 207 is pulled and extended from the tape measure device 107 that is mounted on assembly 100B. Similarly, as the rabbit assembly 100A is returned along the fence 102 back toward the saw, the tape blade 207 is retracted into the tape measure device 107. Notably, the spring loaded nature of the tape measure device 107 urges the tape blade 207 back into the device 107 and, in doing so, may pull the rabbit assembly 100A back toward the saw until it contacts the rabbit stop 225.

Figure 3:
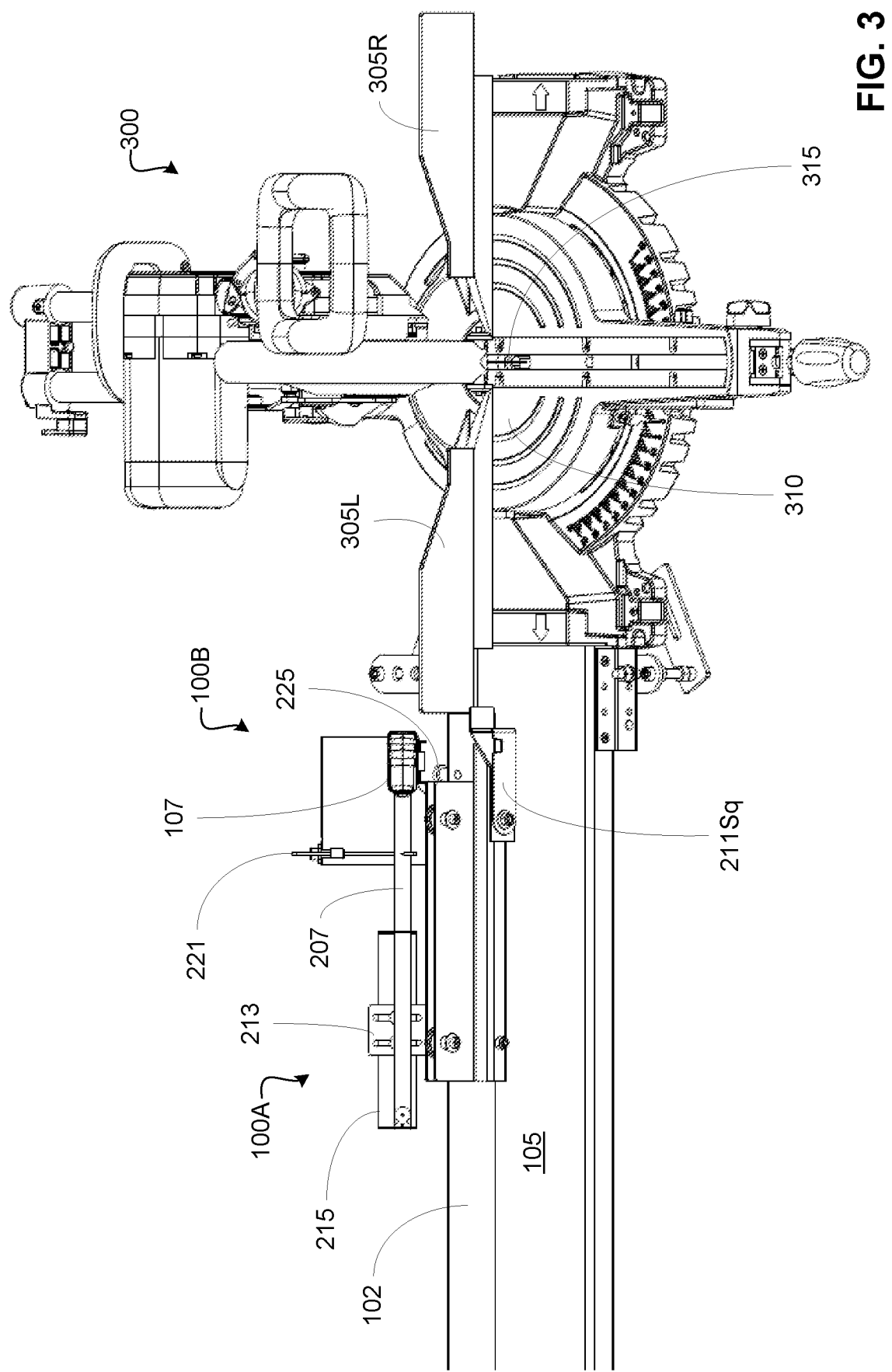
FIG. 3 illustrates the exemplary embodiment of a Smart Cut solution illustrated in FIGS. 1A and 1B, shown mounted to the side of an exemplary miter saw and ready for calibration.

FIG. 3 illustrates the exemplary embodiment 100 of a Smart Cut solution illustrated in FIGS. 1A and 1B, shown mounted to the side of an exemplary miter saw 300 and ready for calibration. As would be understood by one of ordinary skill in the art, the miter saw 300 includes a deck surface 310 and fences 305L, 305R to the left and right of the saw blade 315. A board may be laid on the deck surface 310, abutted to the fence(s) 305 and cut with blade 315.

The exemplary embodiment 100 of the Smart Cut solution has been mechanically mated to the left side of the miter saw 300 such that the table 105 is aligned with the saw's deck surface 310, according to the method described above. Moreover, the fence 102 may be aligned with the saw's fence 305 in order to effectively use the Smart Cut solution. Consequently, a board laid on top of the table 105 and abutted to the fence 102 may simultaneously be laid on top of the saw's deck surface 310 and abutted to the saw's fence(s) 305 (if the fence(s) are aligned).

The rabbit 100A is in a right-most position, in contact with the rabbit stop 225. A tape measuring device 107 is removably mounted in carriage assembly 100B. The tape blade 207 is extended from the measuring device 107 and anchored at its end to the tape measure calibration bracket 215. Notably, the measuring device 107 is spring-loaded, as would be understood by one of ordinary skill in the art, and so is biased to "pull" the rabbit assembly 100A into contact with rabbit stop 225.

The needle 223 of measurement indicator 221 aligns with a measurement demarcation indicated on tape blade 207. Notably, for the Smart Cut embodiment 100 to be calibrated and ready for accurate and efficient conversion of board lengths, the measurement demarcation associated with the measurement indicator 221 should correspond to a distance between a surface provided by jig component 211 and a proximate edge of saw blade 315. Calibration of this distance will be described in more detail below.

Notably, and as will become evident from further review of the disclosure, an advantage of Smart Cut embodiments is that no component of the embodiment is mounted on the saw fence(s) 305 or otherwise mounted in a position that might impede the saw from being used in a miter cut application.

Figure 4:
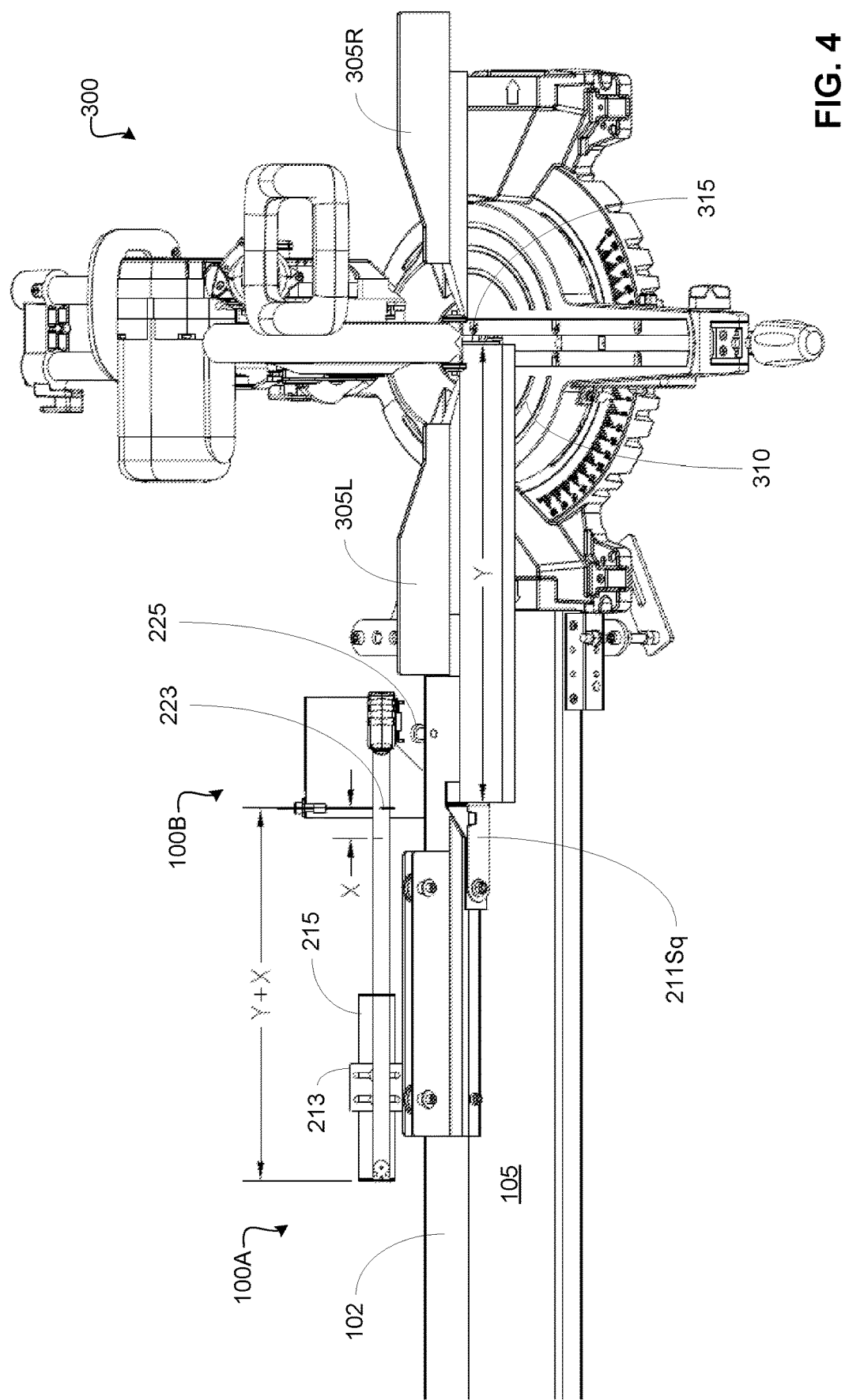
FIGS. 4 and 5 illustrate steps for calibrating the embodiment illustrated in FIG. 3 using a board of a known length "Y"
Figure 5:
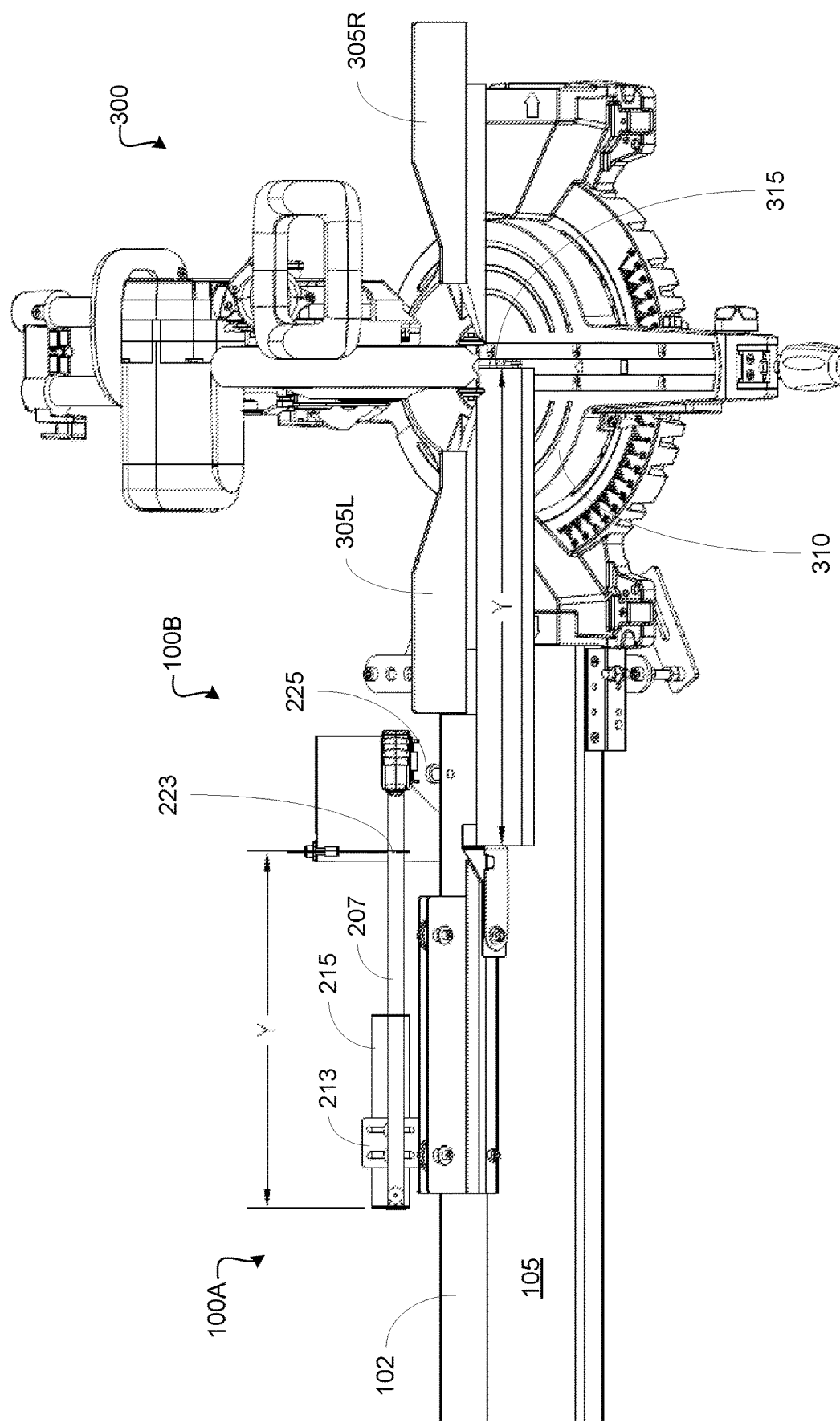

FIGS. 4 and 5 illustrate steps for calibrating the embodiment illustrated in FIG. 3 using a board of a known length "Y". Referring first to the FIG. 4 illustration, a board of known length "Y" has been placed on the Smart Cut embodiment 100 such that a first end of the board is nested or abutted to the jig component 211Sq while the opposite end of the board is abutted to the side of blade 315. Once calibrated, the measurement demarcation indicated by needle 223 will correspond to the "Y" length of the board. However, because the Smart Cut embodiment 100, as illustrated in FIG. 4, has not yet been calibrated, the measurement demarcation indicated by the needle 223 is longer than the length "Y," namely, the needle indicates a measurement of "Y+X." Notably, depending on the relative length of the board being used for calibration of the Smart Cut solution, the initial measurement on tape 207 indicated by the needle 223 may be "Y–X" or "Y+X." In the exemplary illustration of FIG. 4, the board being used for calibration happens to be longer than "Y" by a length of "X."

To adjust the calibration, the fasteners attaching calibration bracket 215 to slotted mounting plate 213 on the rabbit assembly 100A may be loosened such that the calibration bracket 215 is adjusted back toward the carriage assembly 100B. It can be understood from the FIG. 5 illustration that such an adjustment has been made such that the measured length indicated on tape blade 207 by needle 223 is "Y", thereby corresponding to the length of the board used for calibration. If the initial indication by needle 223 had been "Y–X" then adjustment of the calibration bracket 215 would have been in a direction away from the carriage assembly 100B.

The FIG. 5 illustration demonstrates a calibrated Smart Cut solution 100 such that no matter where the rabbit assembly 100A is positioned along the fence 102 the distance between the jig component 211 and the inside edge of the saw blade 315 will correspond to the measurement demarcation on the tape blade 207 indicated by the needle 203. Removal of the board will allow the spring-loaded bias of the tape measure device 107 to pull the rabbit assembly 100A back to the rabbit stop 225. By contrast, insertion of a board into the system 100 will allow a user to position the board beneath the saw blade 315, thereby also positioning the rabbit assembly 100A along the fence 102, until the measurement indicated by needle 223 corresponds to a desired length for the board. Once positioned, the saw 300 may be powered and the board length converted.

Figure 6A:
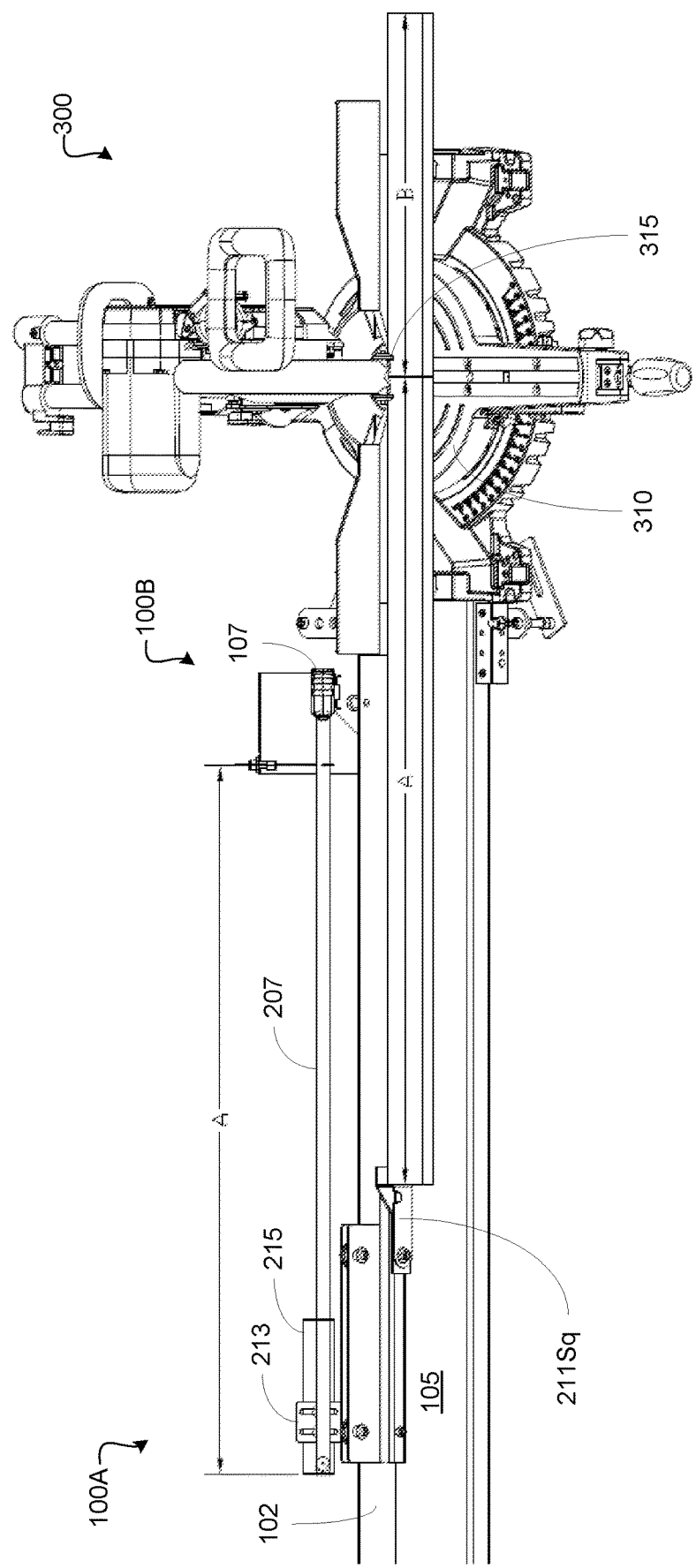
FIGS. 6A and 6B illustrate steps for converting a board to a desired length with square cuts, using the calibrated embodiment of a Smart Cut solution illustrated in FIGS. 4 and 5.
Figure 6B:
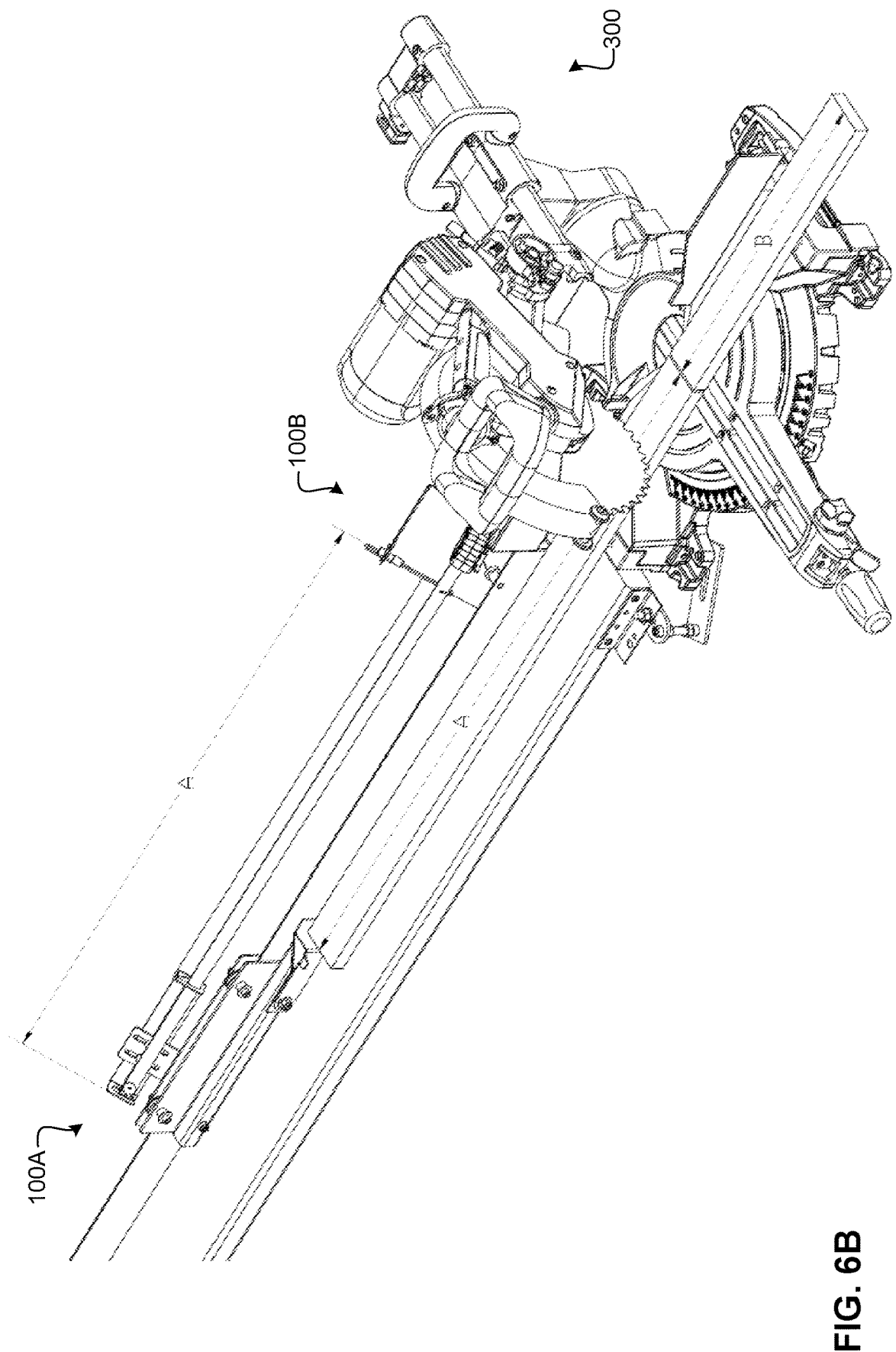

FIGS. 6A and 6B illustrate steps for converting a board to a desired length with square cuts, using the calibrated embodiment of a Smart Cut solution illustrated in FIGS. 4 and 5. As can be understood from the FIGS. 6A and 6B illustrations, a board of length "A+B" has been placed on the Smart Cut enabled miter saw 300. The user desires to convert the board from its length of "A+B" to a length of "A."

The board of "A+B" length (the actual length of the board is A+B+the kerf of the saw blade) has been positioned beneath the miter saw blade 315 and is engaged to the rabbit assembly 100A of the Smart Cut system. If the board is moved left relative to the miter saw blade 315, the tape measure 107 extends the tape blade 207 to indicate a longer distance "A" between the square cut jig component 211Sq and the proximate edge of the miter saw blade 315. Conversely, if the board is moved right relative to the miter saw blade 315, the tape measure 107 retracts the tape blade 207 (and "pulls" the rabbit to keep it engaged with the end of the board) to indicate a shorter distance "A" between the square cut jig component 211Sq and the proximate edge of the miter saw blade 315. Advantageously, a user of the Smart Cut solution may keep a position in front of the saw 300 as the board is positioned because the measurement indication by the needle 223 may be easily ascertained without any need for the user to take a new position. Once the board is positioned such that the needle 223 indicates a measurement corresponding to the desired length "A," the user powers the blade of the miter saw and cuts the board. The length "B" to the right of the saw blade 315 is scrapped. Notably, the length of the board was cut to a desired length "A" without the user ever having to measure the board in a traditional manner with a tape measure, mark the measurement, use a square to mark a cut line, or position the board such that the marked cut line lines up properly with the saw blade.

Figure 7A:
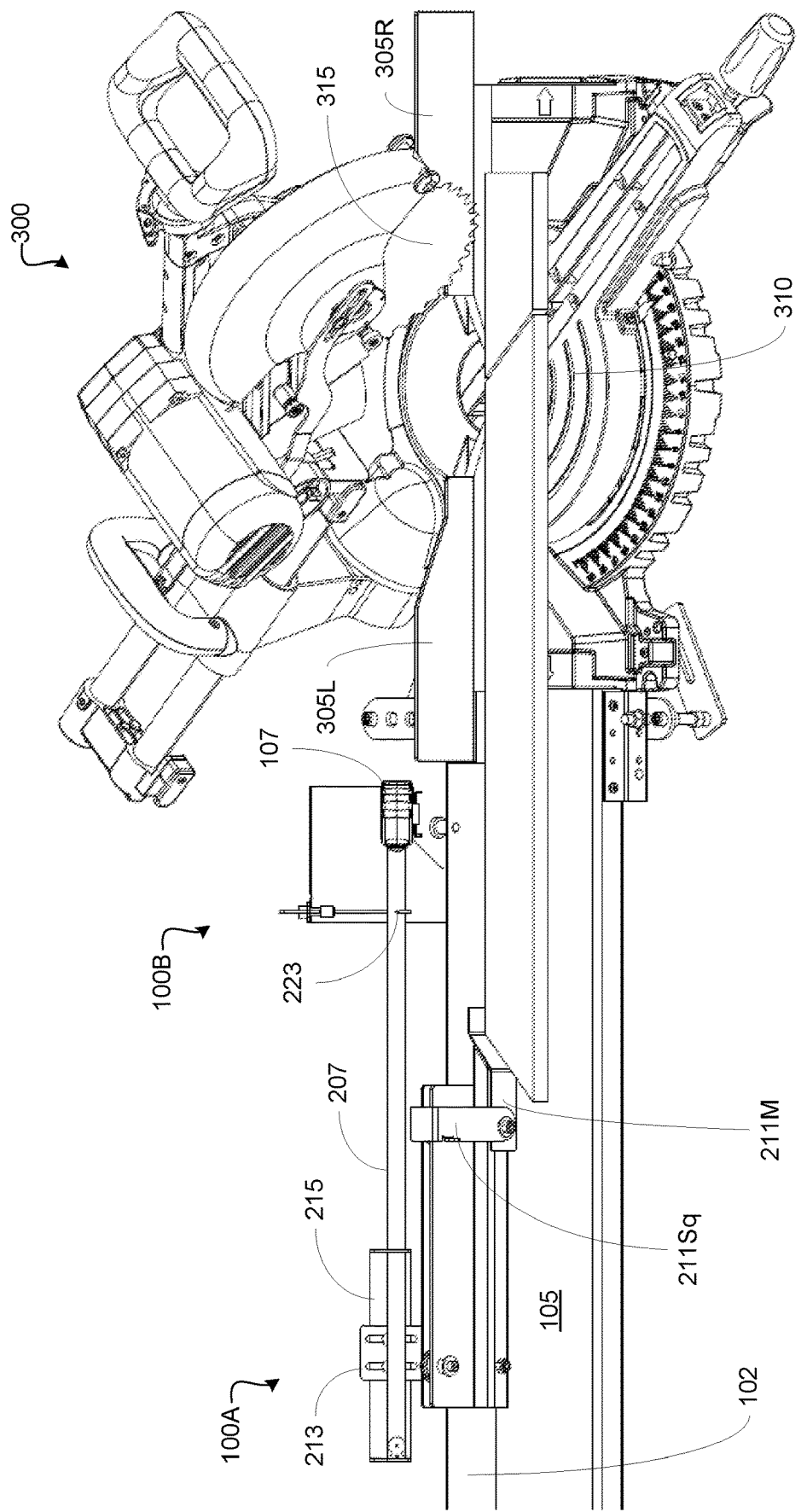
FIGS. 7A and 7B illustrate steps for converting a board to a desired length with miter cuts, using the calibrated embodiment of a Smart Cut solution illustrated in FIGS. 4 and 5.
Figure 7B:
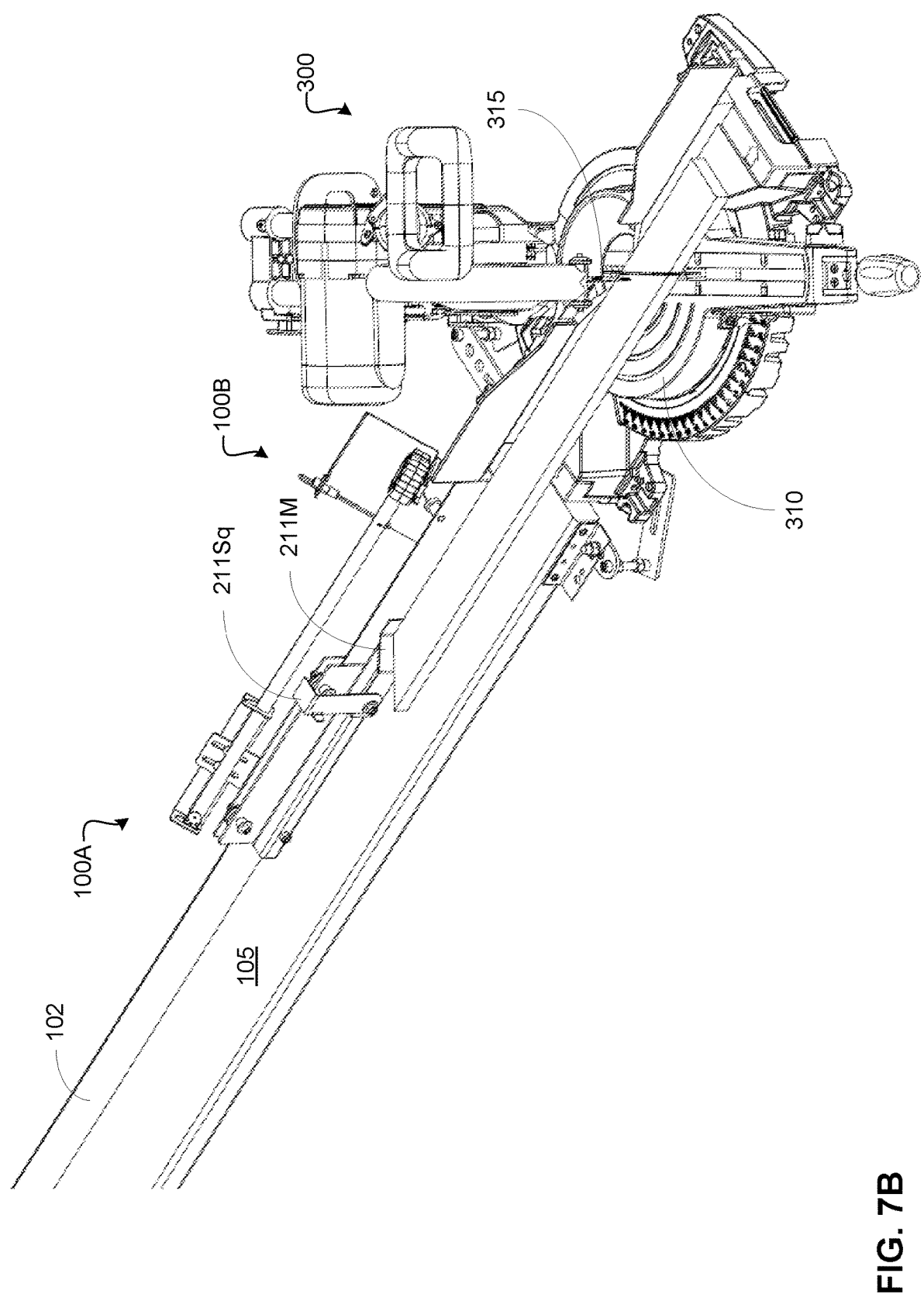

FIGS. 7A and 7B illustrate steps for converting a board to a desired length with miter cuts, using the calibrated embodiment of a Smart Cut solution illustrated in FIGS. 4 and 5. The methodology for using the Smart Cut solution as shown in the FIGS. 7A and 7B illustrations is largely the same as what has been described above relative to the FIGS. 6A and 6B illustrations. Notably in the FIG. 7 illustrations, however, the jig component 211Sq for receiving butt cut boards has been rotated up and away such that the board may be engaged with the jig component 211M which is configured to receiving the end of a miter cut board. The measurement indicated by the needle 223 corresponds to the distance between the inner corner of jig component 211M and the edge of the kerf generated by saw blade 315. Advantageously, the saw 300 may be used in a miter cut configuration, or a compound miter cut configuration, without being impeded by the Smart Cut solution which is mounted outside of the spatial envelope required for the miter saw to function. Additionally, it is an advantage of embodiments of the Smart Cut solution that, once calibrated, the distance from the jig component 211 along the inside edge of the board to the saw blade 315 is consistent whether the user is performing square cuts, inside miter cuts, outside miter cuts, or any combination thereof. Recalibration may not be necessary when alternating cut angles from one board to the next.

Systems and methods according to the solution for efficiently and accurately converting material length using a miter saw, or other saw type, have been described using detailed descriptions of embodiments thereof. The exemplary embodiments have been provided by way of example and are not intended to limit the scope of the disclosure. The described embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a system or method according to the solution for converting material length using a miter saw is not limited by what has been particularly shown and described herein above. Rather, the scope of the disclosed solution is defined by the claims that follow.

What is claimed is:

1. A system for converting material length using a powered saw, the system comprising:
   a table defining a horizontal plane and a fence mounted to the table and defining a vertical plane;
   a carriage assembly configured for removably receiving a tape measuring device;
   a tape measuring device removably mounted on the carriage assembly, wherein the tape measuring device is spring-loaded and comprises a retractable blade with a hook end and measurement demarcations incrementing uniformly beginning with "zero" at the hook end;
   a measurement indicator comprising a pointer positioned in association with the retractable blade, wherein the pointer is operable to indicate one of said measurement demarcations; and a rabbit assembly in slidable communication with the fence, wherein the hook end of the retractable blade is removably connected to the rabbit assembly and positioning of the rabbit assembly along the fence is urged by the spring-loaded tape measuring device;

wherein when the table is mounted to a powered saw with a saw blade, the measurement indicated by the pointer of the measurement indicator corresponds to a length between a stop surface of the rabbit assembly and a proximate edge of the saw blade.

2. The system of claim 1, wherein the measurement indicator comprises a needle.

3. The system of claim 1, wherein the rabbit assembly comprises one or more sheaves configured to promote transition of the rabbit assembly position along the fence.

4. The system of claim 1, wherein the rabbit assembly comprises one or more bearings configured to promote transition of the rabbit assembly position along the fence.

5. The system of claim 1, wherein the stop surface of the rabbit assembly is defined by a pair of jig components, a first jig component of said pair defines a stop surface that mates to an angle-cut board end, a second jig component of said pair defines a stop surface that mates to a square-cut board end, and the first jig component is operable to rotate up and away from the second jig component in order to expose the second jig component for use.

6. The system of claim 1, wherein the rabbit assembly further comprises a tape measure calibration bracket operable to be adjusted relative to the carriage assembly.

7. The system of claim 1, further comprising adjustable legs for aligning the table with a table of the saw.

8. The system of claim 1, further comprising a rabbit stop configured to prevent the rabbit assembly from traveling beyond a given point of the fence.

9. A method for converting material length using a powered saw with a saw blade, the system comprising:
mounting to a powered saw a table defining a horizontal plane;
mounting a fence to the table, wherein the fence defines a vertical plane;
mounting a carriage assembly to the table, wherein the carriage assembly is configured for removably receiving a tape measuring device;
mounting a tape measuring device on the carriage assembly, wherein the tape measuring device is spring-loaded and comprises a retractable blade with a hook end and measurement demarcations incrementing uniformly beginning with "zero" at the hook end;
positioning a measurement indicator comprising a pointer in association with the retractable blade, wherein the pointer is operable to indicate one of said measurement demarcations;
mounting a rabbit assembly in slidable communication with the fence, wherein a
hook end of the retractable blade is removably connected to the rabbit assembly and positioning of the rabbit assembly along the fence is urged by the spring-loaded tape measuring device; and
positioning a board simultaneously on the table and the powered saw such that a
first end of the board is received into a stop surface of the rabbit assembly, wherein the measurement indicated by the pointer of the measurement indicator corresponds to a length between the stop surface of the rabbit assembly and a proximate edge of the saw blade.

10. The system of claim 9, wherein the measurement indicator comprises a needle.

11. The system of claim 9, wherein the rabbit assembly comprises one or more sheaves configured to promote transition of the rabbit assembly position along the fence.

12. The system of claim 9, wherein the rabbit assembly comprises one or more bearings configured to promote transition of the rabbit assembly position along the fence.

13. The system of claim 9, wherein the stop surface of the rabbit assembly is defined by a pair of jig components, a first jig component of said pair defines a stop surface that mates to an angle-cut board end, a second jig component of said pair defines a stop surface that mates to a square-cut board end, and the first jig component is operable to rotate up and away from the second jig component in order to expose the second jig component for use.

14. The system of claim 9, wherein the rabbit assembly further comprises a tape measure calibration bracket operable to be adjusted relative to the carriage assembly.

15. The system of claim 9, further comprising adjustable legs for aligning the table with a table of the saw.

16. The system of claim 9, further comprising a rabbit stop configured to prevent the rabbit assembly from traveling beyond a given point of the fence.

* * * * *